United States Patent [19]

Boardman et al.

[11] Patent Number: 4,983,353

[45] Date of Patent: Jan. 8, 1991

[54] NOVEL PASSIVE APPROACH TO PROTECTING THE PRIMARY CONTAINMENT BARRIER FORMED BY THE INTERMEDIATE HEAT EXCHANGER FROM THE EFFECTS OF AN UNCONTROLLED SODIUM WATER REACTION

[75] Inventors: Charles E. Boardman, Saratoga; John P. Maurer, San Jose, both of Calif.

[73] Assignee: General Electric Company, San Jose, Calif.

[21] Appl. No.: 322,481

[22] Filed: Mar. 13, 1989

[51] Int. Cl.$^5$ .............................. G21C 9/00; F28D 7/00
[52] U.S. Cl. ...................................... 376/283; 376/405; 122/32; 165/38
[58] Field of Search ................ 376/283, 402, 403, 404, 376/405; 122/32, 33; 165/38, 134.1

[56] References Cited

U.S. PATENT DOCUMENTS

| | | | |
|---|---|---|---|
| 3,924,675 | 12/1975 | Essebaggers | 122/32 |
| 4,452,182 | 6/1984 | Baudoin | 122/32 |
| 4,515,109 | 5/1985 | Jullien | 122/32 |
| 4,589,375 | 5/1986 | Artaud et al. | 122/32 |
| 4,600,554 | 7/1986 | Brachet et al. | 376/402 |
| 4,905,757 | 3/1990 | Boardman et al. | 376/405 |

*Primary Examiner*—Daniel D. Wasil
*Attorney, Agent, or Firm*—Robert R. Schroeder

[57] ABSTRACT

In a steam generator utilized with a liquid sodium cooled nuclear reactor, provision is made to vent the violent sodium water reaction emanating from a tube rupture casualty. The steam generator includes a sodium plenum at the bottom thereof containing a conventional rupture disk for venting sodium, steam, and reaction products including hydrogen immediately upon a tube rupture casualty. The invention includes providing an alternate concentric flow path interior to the steam generator and parallel to the tube bundle. This alternate concentric flow path extends from the upper portion of the steam generator down into the lower head or plenum adjacent to the pressure relief diaphragm. This alternate path is partially filled with sodium during normal reactor operation. In the event of a tube bundle break, the alternate flow path dumps its sodium through the conventional rupture disk and then provides an immediate alternate pressure release path in parallel with the tube bundle for steam and water flow from the tube rupture site to the rupture disk. This parallel flow path reduces the pressure differential from the water/steam flow through the tube bundle such that water/steam does not flow back through the intermediate heat transport system to the intermediate heat exchanger (IHX) where it would react with residual sodium and potentially damage the IHX tube bundle which is part of the reactor primary containment barrier.

6 Claims, 4 Drawing Sheets

NOVEL PASSIVE APPROACH TO PROTECTING THE PRIMARY CONTAINMENT BARRIER FORMED BY THE INTERMEDIATE HEAT EXCHANGER FROM THE EFFECTS OF AN UNCONTROLLED SODIUM WATER REACTION

BACKGROUND OF THE INVENTION

This invention relates to steam generators for use in sodium cooled nuclear reactors More particularly, a steam generator is disclosed which has an alternate path for relieving a sodium water reaction and injected water/steam upon a tube casualty causing a violent sodium water reaction

STATEMENT OF THE PROBLEM

Sodium reactors utilizing sodium contain two discrete sodium loops. A first and primary loop is in the reactor vessel. This primary sodium loop is radioactive and consequently is confined to the reactor vessel. Sodium in this loop circulates through the reactor core in a so-called hot leg and to an intermediate heat exchanger. In the intermediate heat exchanger, the heat from the nuclear reaction from the reactor core is transferred to sodium in a secondary and nonradioactive loop. Once the sodium of the primary loop liberates its heat, it then passes in a so-called cold leg to pumps that force the required circulation. The pumps, preferably interior of the reactor and of the electromagnetic variety, force the sodium of the primary loop through the reactor core so that the cycle of the primary loop endlessly repeats.

A second and secondary non-radioactive sodium loop transports the heat of the nuclear reaction from the intermediate heat exchanger in the reactor vessel to a steam generator, the steam generator being located exterior of the reactor vessel. Typically the sodium of the secondary loop passes through an intermediate heat exchanger within the reactor vessel. In this intermediate heat exchanger, it receives the heat from the sodium of the primary loop and returns from the reactor vessel in a so-called hot leg to the steam generator.

At the steam generator, the hot sodium is cooled by counterflow heat transfer to water which is heated and turned into steam. This water flows upwardly through helically coiled tubes. The liquid sodium flows downwardly on the outside of the helically coiled tubes, these tubes being immersed in the hot sodium. Steam is generated for conventional electrical power production by turbines, generators and condensers. The sodium of the secondary loop then passes in a cold leg through pumps interior of the steam generator which force circulation. The cooled sodium flows back to the intermediate heat exchanger in the reactor vessel for an endless repetition of the cycle of the secondary loop.

A preferred form of a steam generator is set forth in U.S. patent application Ser. No. 231,031, filed Aug. 11, 1988 and is entitled Compact Intermediate Heat Transport System for Sodium Cooled Reactor, now U.S. Pat. No. 4,905,757, issued Mar. 6, 1990. In this steam generator the defined secondary loop includes a sodium surge volume capped by an inert gas, a central concentrically mounted pump, and a steam generator having helically coiled tubes. All of these components are contained interiorly of a single, upstanding substantially cylindrical vessel.

The cylindrical vessel has its axis vertically disposed and includes an inner concentric cylindrical vessel open at the bottom to a plenum. The interstitial volume between the inner cylindrical vessel and the main steam generator vessel contains the tube bundle and is used for steam generation at the termination of the hot leg of the secondary loop. Typically four tubes sheets at the bottom of the steam generator and four corresponding tubes sheets at the top of the steam generator serve as the respective beginnings and ends of tubes of the steam generator. These tubes are helically wound in the cylindrical interstitial volume between the outside of the inner cylindrical vessel and the inside of the outer cylindrical vessel which is the steam generator shell. Water to be vaporized into steam flows from the bottom of the generator to the top of the generator. Sodium, for heating the water in the tubes, flows from its inlet nozzle at the top of the cylindrical vessel, through the shell-side of the tube bundle, to the bottom plenum of the cylindrical vessel.

At the bottom of the vessel, the sodium passes into a common plenum connecting the outer cylindrical vessel and the inner cylindrical vessel. A pump, preferably of the electromagnetic variety, may be located within the inner vessel. This pump pumps the sodium in the cold leg of the secondary loop upwardly through the interior of the inner vessel to the top of the steam generator. At the top of the steam generator a volume of inert gas accommodates thermal expansion/contraction of the sodium in the system. Discharge of the sodium from the top of the vessel to the main reactor enables the secondary loop to endlessly repeat.

Sodium water casualties in the secondary loop of sodium reactors are known. It is, of course, also well known that the reaction between sodium and water is a violent and explosive reaction. It has been found that sodium water reactions in sodium heated steam generators commonly effect more than one tube. Indeed, for the purposes of the sodium water casualty scenario guarded against by this invention, it is assumed that a great many tubes are effected.

To relieve pressure caused by sodium water casualties in such steam generators, the prior art has caused a rupture disk to be installed at the plenum on the very bottom of the steam generator. This rupture disk constitutes a mechanical fuse which is broken by the shock of the violent sodium water reaction. Upon the sodium water casualty, this fuse ruptures and permits the steam generator to be emptied of liquid sodium, generated hydrogen, sodium oxide, sodium hydride, water and steam. In order for such emptying to occur, components of the reaction must pass from the site of the ruptured tubes thru the remaining intact tube bundle before the reaction components can pass outside of the steam generator at the ruptured membrane.

Assuming that such a casualty occurs, at least three aggravating circumstances can be assumed to be present for the casualty scenario herein addressed. These aggravating assumptions would be required by the National Regulatory Commission (NRC) unless an inherent or passive device, such as the subject of the non-safety related steam and feedwater isolation and blowdown valves.

First, it will be assumed that the main steam and feedwater line isolation valves are either inoperative or, if operative, not properly actuated In either case, the site of the ruptured tubes will be supplied with a steady supply of steam and/or feedwater. The steam will react with the sodium in a continuing violent reaction. The high temperatures produced by the reaction can be assumed to increasingly penetrate the secondary loop through an increasing number of ruptured tubes.

Second, it will be assumed that the steam/water dump system valves are either inoperative or, if operative, not properly actuated. Therefore, the steam/water inventory in the steam generator system is not vented to the atmosphere, and the steam/water supplied to the site of the ruptured tubes is not diminished by the dump system.

Third, it will be assumed that the tube rupture occurs in the singular most undesirable location. This undesirable location is in the upper portion of the steam generator tube bundle. In such a location, the reactive components generated by the violent continuing sodium water reaction will have to pass over the intact lower tubing before escape can occur from the plenum of the steam generator vessel at the ruptured diaphragm.

DISCOVERY OF THE PROBLEM

We have discovered that it is more than conceivable that with a tube rupture at the top of prior art steam generators, a continuous supply and venting of steam and/or water will generate a pressure differential between the sodium inlet and outlet nozzles of the steam generator. This pressure differential will continue after the steam generator has been relieved of sodium because of steam/water flow friction between the site of the tube ruptures and open disk in the bottom of the steam generator. Simply stated, steam from the site of the broken or ruptured tubes will have to flow past the remaining intact helically coiled tubes to escape. In other words, the site of the initial tube breakage will remain under relatively high pressure in an environment of continuously supplied steam.

Assuming that steam is generously and continually supplied to such a casualty site, the broken, secondary sodium loop will experience a continuing and advancing inundation of invading steam. That is, the continuously reacting high temperature Na/steam interface will be forced by the pressure differential within the steam generator to move in a backward direction down the secondary hot leg piping toward the IHX which is submerged in the radioactive primary sodium.

Logically, and completing the casualty scenario, the secondary loop will be penetrated by the steam until invasion of the main reactor vessel occurs thru a high temperature failure of thin walled IHX tubes. Specifically, the radioactive sodium of the primary loop could become involved in the sodium water casualty if the casualty were allowed to proceed.

It should be understood that the movement of high temperature reacting Na/steam interface towards the primary loop and downward into the IHX will only occur if the continuing steam flow entering the shell side of the steam generator produces a sufficient pressure differential (12 psi or more) as it passes thru the tube bundle to the rupture disk to overcome the elevational difference between the IHTS piping and the IHX. Progression of the Na/water-steam interface into and within the main reactor vessel thru ruptured IHX tubes could conceivably occur.

We are unaware of the prior art considering this casualty scenario Insofar as discovery of this problem can constitute invention, invention is therefore claimed

SUMMARY OF THE INVENTION

In a steam generator utilized with a liquid sodium cooled nuclear reactor, provision is made to vent the violent explosion emanating from tube rupture. Tube ruptures in such steam generators causes a sodium water reaction which in this disclosure is vented along two discrete paths to assure that under no condition will it be possible to develop a sufficient pressure differential to force the Na/steam interface backward and downward into the thin walled IHX tubes In the preferred embodiment, the steam generator is of the type combining a thermal expansion volume, one or more electromagnetic pumps with or without a jet pump to increase the flow rate for circulating sodium, and a large number of helically coiled tubes for generating steam. The steam generator includes a sodium plenum at the bottom thereof and a conventional rupture disk for venting sodium, steam, hydrogen and other reaction compounds immediately upon a tube rupture casualty. The steam generator is contained within a cylindrical vessel and defines interior of the vessel an outside and annular downcoming hot leg and an interior and concentric upcoming cold leg. These hot and cold legs are interconnected at the bottom of the steam generator vessel at the plenum. Typically, the steam generating tubes are commenced at tube sheets at the bottom of the steam generator, are helically coiled around the periphery of the inner concentric vessel interior of the steam generator, and have water channelled therein to counterflow the downcoming liquid sodium in the hot leg of the secondary loop. The casualty scenario anticipated by the disclosed safety feature includes a rupture of a large number of tubes in the top of the steam generator. This rupture is presumed to have a continuous supply of steam and generates back pressure continuously at the site of the tube rupture and accompanying violent reaction It is presumed that the rupture diaphragm opens but the remaining intact tubes present flow resistance to the escaping steam flowing past the remaining intact generator tubes between the rupture site and the open diaphragm. This back pressure forces the steam through the secondary sodium loop to and towards the IHX in the nuclear reactor vessel for eventual invasion into the main reactor with chemical reaction of the radioactive sodium in the primary loop.

To prevent this casualty scenario, the invention includes providing an alternate concentric flow path interior of the steam generator. This alternate concentric flow path extends from the upper portion of the steam generator down into the plenum adjacent the diaphragm. This alternate path is filled with sodium during normal reactor operation. Upon a casualty, the alternate flow path dumps its sodium through the conventional rupture disk and then provides an immediate additional pressure relief path for steam, hydrogen and sodium from the site of the violent reaction at the tube rupture site. Consequently, the steam venting pressure drop within the shell at the steam generator can be limited to a value which is insufficient to drive the interface downward into the IHX which behaves like a U-tube manometer.

Other Objects, Features and Advantages

An object to this invention is to provide a sodium steam generator with a vent path from the top of the steam generator to the plenum at the bottom of the steam generator. This parallel alternate vent path provides for immediate pressure relief of a tube rupture casualty adjacent the top of the generator. Accordingly, and in the preferred embodiment of the invention, a second vent path from the cover gas region at the top of the steam generator is provided down to the plenum at the bottom of the steam generator. Preferably, this second vent path is provided by a second concentric wall surrounding the inner cylindrical vessel. This second concentric wall extends above the sodium region into the inert gas cover at the top of the steam generator. It also extends down from the top into the plenum.

During normal operation, this vessel defines an interstitial volume between the inner cylindrical vessel and the secondary vessel. This volume is filled with a standing and normally static head of sodium supported on the low pressure zone in the secondary loop from the reactor plenum. During normal operation, this vent path is filled with sodium from the low pressure region of the secondary loop. During a tube casualty, this tube immediately looses its sodium content by flow to the plenum which is opened at the diaphragm. The conduit empties of sodium and provides a direct flow path from the top of the reactor and out the ruptured diaphragm. Consequently, pressure is relieved and steam inundation of the secondary loop to and towards the nuclear reactor vessel is avoided.

A serendipitous advantage of the preferred embodiment is that the sodium in the concentric conduit is drawn down in normal steam generator operation under the low pressure within the steam generated outlet plenum. Consequently, the cover gas region over the top of the secondary conduit is likewise extended downwardly. This extended cover gas region forms a cylindrical annulus between the hot downcoming peripheral sodium in the hot leg of the steam generator and the upcoming pumped sodium in the center portion of the steam generator. Consequently, heat from the hot leg is prevented from shunting across to the sodium of the cold leg. More efficient insulation of the cold and hot legs interior of the steam generator results.

BRIEF DESCRIPTION OF THE DRAWINGS

Other objects, features and advantages of this invention will become more apparent after referring to the following specification and enclosed drawings in which.

Figure 1:
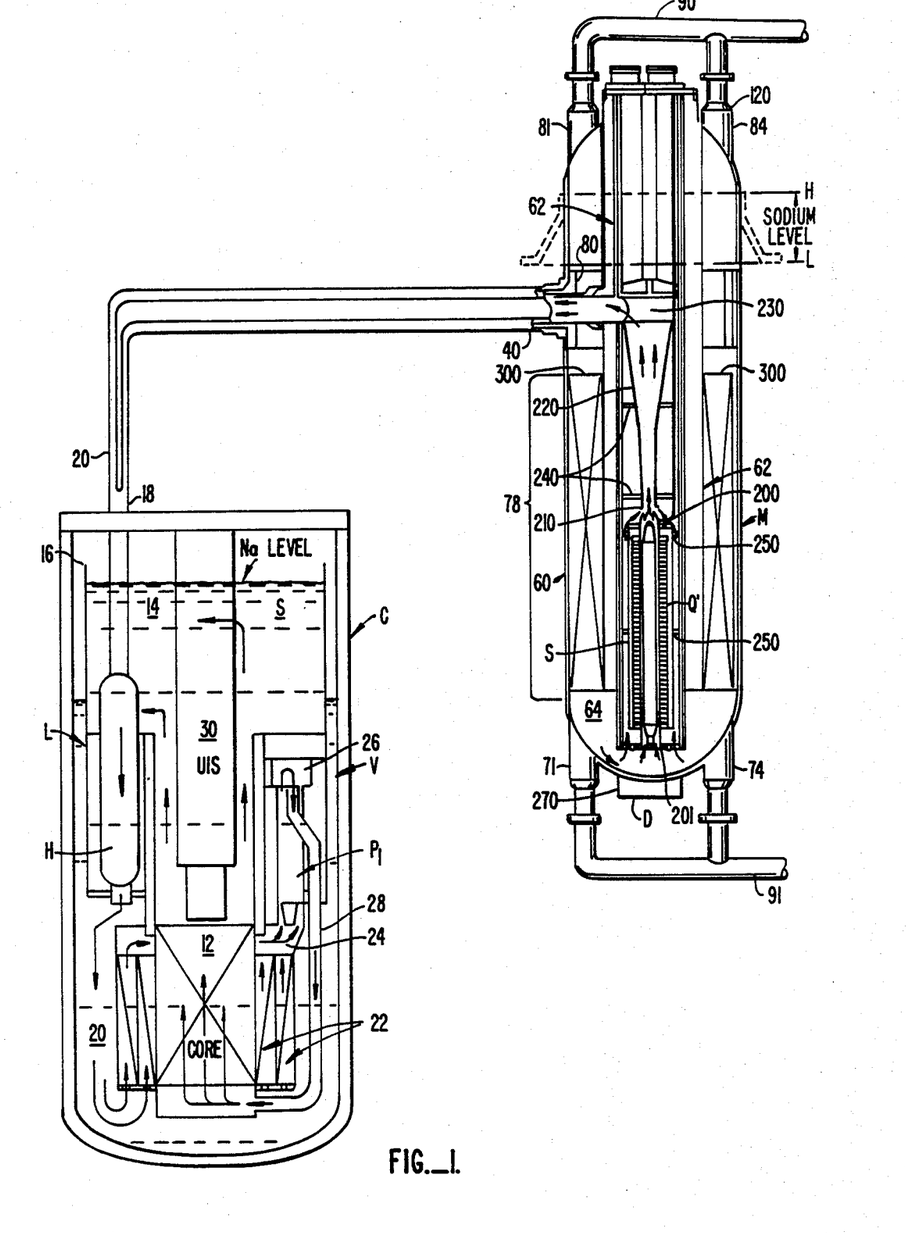
FIG. 1 is a side elevation schematic section of a reactor vessel and steam generator connected in side-by-side relation, the reactor vessel being prior art and the steam generator being related art to the disclosure herein set forth.

Referring to FIG. 1 a sodium cooled nuclear reactor vessel V is illustrated. The particular vessel V shown is a prior art configuration.

A steam generator M is illustrated operatively connected to the sodium reactor. The steam generator here shown is a preferred embodiment of a related art steam generator. This steam generator is not prior art. A complete description of this generator may be found in U.S. patent application Ser. No. 231,031 filed Aug. 11, 1988 and entitled Compact Intermediate Heat Transport System for Sodium Cooled Reactor, now U.S. Pat. No. 4,905,757, issued Mar. 6, 1990.

Referring to the reactor V, a pool of sodium 14 is confined within an inner shroud vessel 16. Sodium pool 14 forms the so-called hot leg. Tracing the hot leg of the sodium cooled nuclear reactor, sodium from the sodium pool 14 passes upwardly from a core 12 where it receives heat. It thereafter passes downwardly through an intermediate heat exchanger H. In such passage it liberates its heat to the "cold leg" of the secondary loop. After the liberation of heat, the sodium of the primary loop then passes in its own "cold leg" to a bottom plenum 20. In bottom plenum 20 the sodium passes upwardly in a pumping leg at an annulus 22 into pump inlet 24 and through an electromagnetic pump P1. At electromagnetic pump P1, the sodium reverses at loop 26 passing through a discharge plenum 28 to the bottom of the core 12. At core 12 the sodium flows upwardly and to pool 14. The cycle endlessly repeats.

It will be noted that sodium flow occurs within an inner shroud L. Shroud L provides an emergency heat outflow Such emergency heat outflow is not pertinent to this disclosure and will not be further discussed here.

As is common in reactors, a control rod cavity 30 contains applicable control rods for the penetration into and out of the reactor to control the reaction Intermediate heat exchanger H interior of the sodium cooled reactor vessel constitutes the heat exchange interface between the primary and radioactive sodium loop and the secondary sodium loop. As here illustrated, lines 18, 20 provide for secondary sodium flow to and from the intermediate heat exchanger H. As here illustrated, the line 20 is a part of the cold sodium leg of the secondary loop. The line 18 is a part of the hot sodium leg of the secondary loop.

Hot sodium flows in outer concentric pipe 18 into the steam generator M. Generator M constitutes a generally cylindrical vessel with dome closures at both ends and having an outer vessel 60 and an inner and concentric vessel 62.

The interstitial volume between the outer vessel 60 and the inner concentric vessel 62 is filled with helically coiled tubes. These tubes begin at tube sheets placed within lower water inlets 71, 74. The tubes extend upwardly into the interstices between the outer vessel 60 and the inner vessel 62. Specifically, and in the area 78, the tubes coil helically about the inner vessel 62. In such helical coiling, the tubes coil until they reach the upper portion 78 of the steam generator M. At upper portion 78, the tubes pass directly vertically upward to tube terminating tube sheets within steam outlets 81, 84. The steam is generated by the heat transferred from the hot sodium during the upward passage of water through the helically coiled tubes.

The hot leg of the secondary sodium loop continues at inlet pipe 40. Sodium counterflows the water in the helically coiled tubes 78. This counterflow includes passage from the inlet at 40 down to the plenum 64.

At plenum 64, upward sodium flow occurs in two separate paths. First, a single electromagnetic pump Q' is located. Pump Q' takes suction at 201 and discharges high pressure, sodium at 200. The discharged high pressure, sodium passes into the inlet 210 of a jet pump located inside of the interior cylindrical vessel 62 and supported by struts 240

In the second flow path, sodium flows interior of the inner vessel 62 outside of the electromagnetic pump. Specifically, and as indicated at arrow 250, sodium flows in an annulus exterior of the electromagnetic pump and passes into the mixer section 210 of the jet pump. The sodium then exists at a diffuser 220 into an outlet 230. At outlet 230 the sodium is pumped to and towards the heat exchanger H.

It will be seen at the bottom of the steam generator that there is provided a diaphragm D mounted to a protruding nozzle 270. Diaphragm D is designed to rupture in the case of a sodium water reaction. When the diaphragm D ruptures, sodium empties from the steam generator vessel.

Having set forth the prior art sodium reactor vessel V and the related art steam generator M, the casualty scenario against which this invention guards may now be set forth.

It is assumed for purposes of the discovered scenario that a tube rupture has occurred in the worse possible location. Specifically, such a location is shown at 300. It is further assumed that more than one tube is effected by the rupture and the pressure generated by the chemical reaction breaks the rupture diaphragm.

Viewing FIG. 1, it can be seen that the sodium, hydrogen, steam and other compounds from the violent sodium water reaction at 300 have to pass along the entire length of intact tubes within the coiled helical tubes 78 to the rupture diaphragm. After such passage, the gases will find their way into plenum 64 and out diaphragm D at protruding cylindrical nozzle 270 at the bottom of the steam generator. It will be remembered that high pressure steam in lines 90 and high pressure feedwater in lines 91 is assumed to be present. This high pressure steam from the turbine side of the plant and feedwater from supply steam is presumed to flow to the site of the reaction at 300. Accordingly, region 300, the site of the tube breakage, will be presumed to be a high pressure violent reaction continuously supplied with the necessary sodium reactive steam and water to keep the reaction sufficiently long (terminated in the steam generator by Na expulsion thru the rupture disk) to cause a large number of tube ruptures at the site 300.

This being the case, the present casualty scenario presumes that the continuing steam/water flow and associated pressure drop within the tube bundle will force the Na/steam interface along conduits 18, 20 and back into the intermediate heat exchanger H.

It will be realized that as the steam sodium interface penetrates the specific conduits 18 and 20, the conduits will, in all likelihood, propagate the sodium water reaction into the main reactor vessel.

Remembering that the sodium interior of the vessel is radioactive, complication of the disclosed casualty by penetration of the steam into the radioactive vessel is to be avoided. This being the case, the improvement of this invention can now be set forth.

Figure 2:
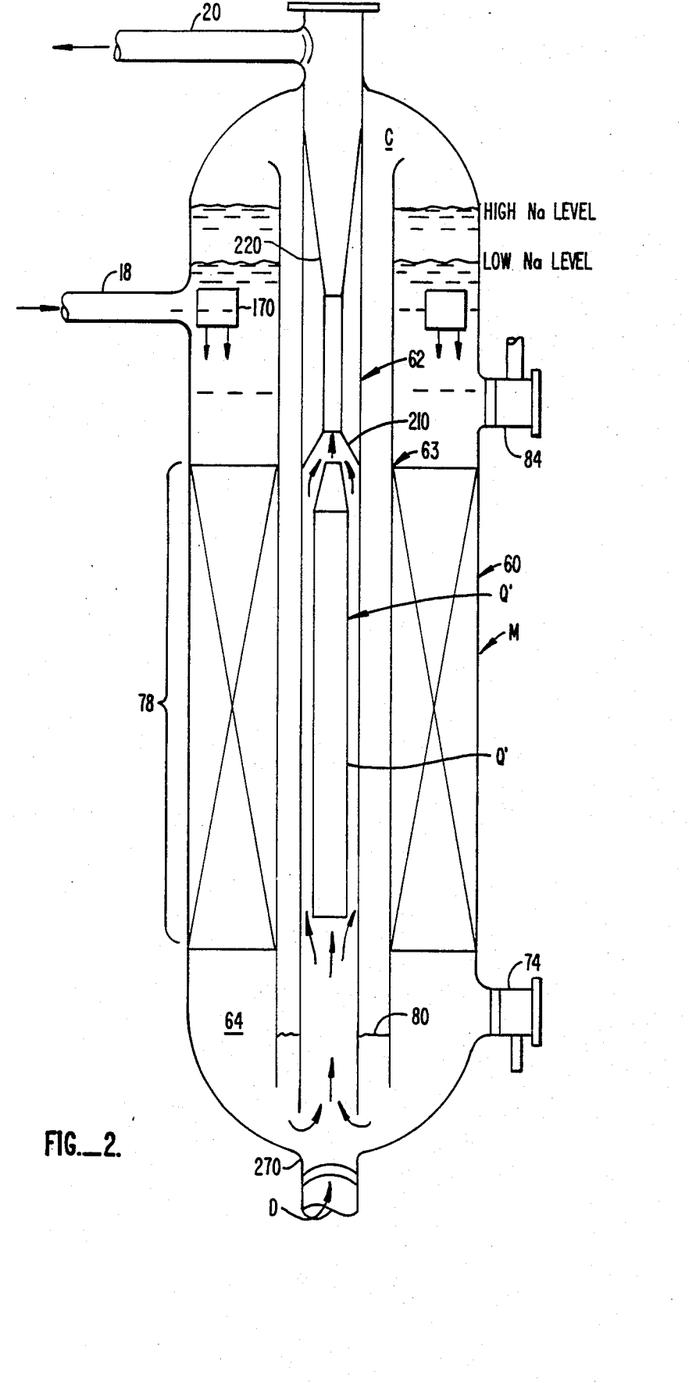
FIG. 2 is a side elevation schematic of the steam generator with the improved emergency relief flow path herein disclosed, the steam generator being shown during normal operation.

Referring to FIG. 2, a steam generator M having an outer cylindrical vessel 60 and an inner cylindrical vessel 62 is illustrated. Between inner cylindrical vessel 62 and the outer vessel 60 there is placed an intermediate cylindrical vessel 63. Intermediate vessel cylindrical 63 opens to the plenum 64 at the bottom. Likewise, intermediate cylindrical vessel 63 opens at the top to the cover gas region C. In the view illustrated in FIG. 2 normal reactor operation is assumed. It is instructive to understand this normal reactor operation so that a serendipitous advantage of this invention can be understood.

Sodium typically flows in from the reactor along leg 18 and is distributed at a manifold 170 at the top of the reactor. The sodium in the hot leg flows downwardly over the helical tubes 78 down into plenum 64. At the plenum 64 the sodium flows inwardly to the inside of the interior cylindrical vessel 62.

At this point, pump Q' acting as an electromagnetic pump, pumps a high pressure, low volume, flow of sodium into a jet pump inlet 210. The sodium discharged from the electromagnetic pump entrains sodium passing about the outside surface of the pump into the mixing section of the jet pump 210. The sodium passes to a diffuser 220 and outwardly on the cold leg 20.

It will be appreciated that plenum 64 is the low pressure region of the secondary sodium loop. The sodium in the interstitial area between the inner cylindrical vessel 62 and the intermediate cylindrical vessel 63 is supported in its static head from the relatively low pressure plenum 64. Plenum 64 has a relative low pressure because it constitutes the suction side of the pump Q'. Consequently, it has a sodium/cover gas interface 80 adjacent the bottom of the interstitial volume between the inner cylindrical vessel 62 and the intermediate cylinder 63.

It can be seen that the cover gas C penetrates downwardly almost the full length of the intermediate cylindrical vessel 63. There is thus placed between the inner cylindrical vessel 62 and its cold leg of sodium and the outer vessel 60 and its contained hot leg of sodium, a region of cover gas C. Insulation by the region of cover gas C occurs not unlike that insulation common in a Dewar flask.

Stated in other terms, the intermediate cylinder 63 prevents heat being shunted directly from the hot leg to the cold leg of the steam generator M.

Figure 3:
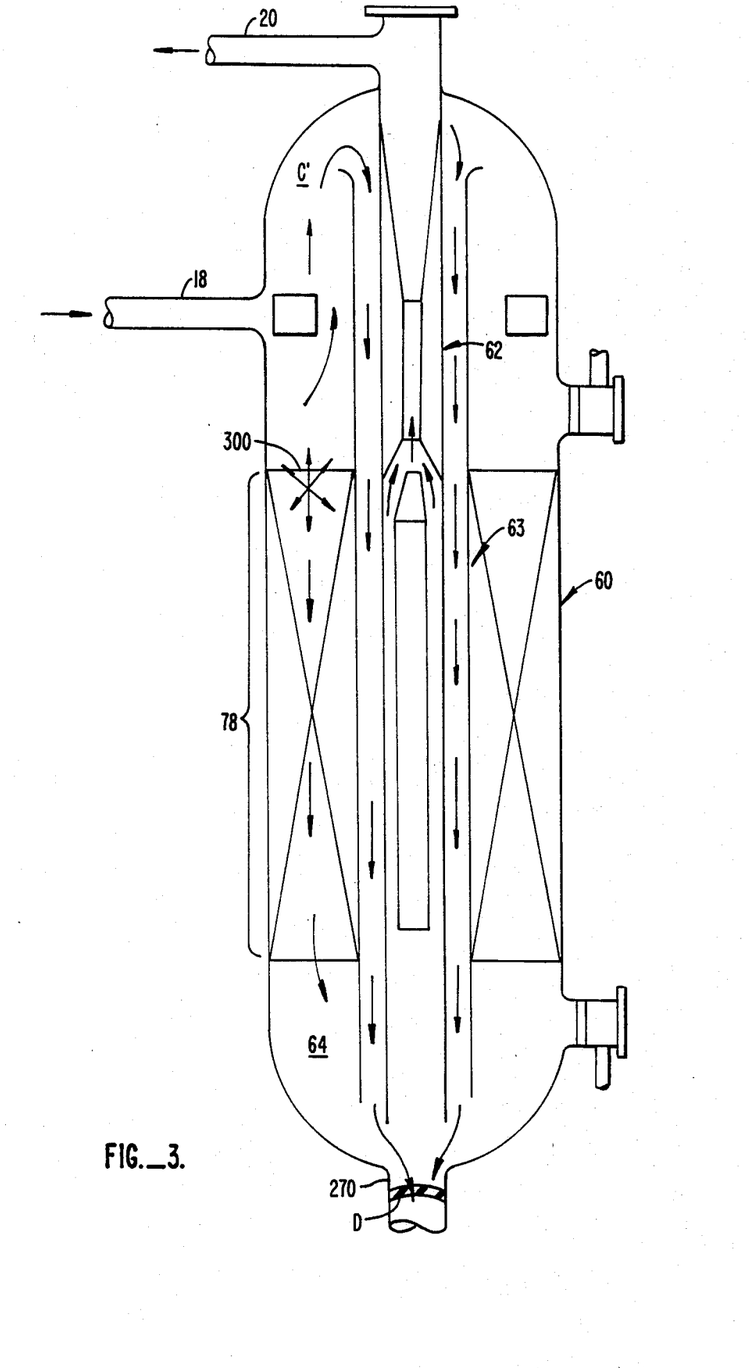
FIG. 3 is a side elevation section similar to FIG. 2 with the operation of the steam generator being illustrated during the casualty scenario set forth.

Having set forth this serendipitous characteristic, operation of the steam generator in the casualty scenarios herein set forth can be understood with respect to FIG. 3.

Assuming that a casualty has occurred in an area 300, the diaphragm D on cylindrical nozzle 270 at plenum 64 immediately ruptures. Liquid sodium from the secondary loop immediately drains to a sodium dissipation system including a holding tank and stack. These conventional prior art systems are not shown.

Regarding the sodium in the interstitial volume between the inner cylindrical vessel 62 and the intermediate vessel 63, sodium likewise immediately drains. This draining of sodium opens a gas free path from the top of the steam generator C directly to the plenum 64. This can be seen to be almost direct from the site of the violent sodium water reaction 300.

This may be easily understood.

Assuming that a chemical reaction has occurred at 300 and steam is continuously being supplied, two flow paths will be present.

First, steam can discharge from the site of the reaction down through the remaining intact tube 78 and out the diaphragm D. Since the remaining intact tubes constitute a considerable flow barrier, especially where the tube rupture is in the upper portion of the tube coils, this route for the outgassing of the components of the violent reaction will have only a minority of the total flow.

An additional flow path is defined between the inner vessel 62 and the outer vessel 63. Specifically with all sodium expelled, gas can pass upwardly from the site of the 25 reaction into the now vacated cover gas region C' and in the top of the intermediate cylindrical vessel 63. From the intermediate vessel 63, a direct and free nonencumbered flow path out the diaphragm D is defined.

Consequently, hot leg inlet 18 and cold leg outlet is 20 does not experience a large pressure differential. Specifically, steam/water from the site 300 cannot penetrate along the length of conduit 18 to effect the continuance of the casualty to and towards the reactor.

It should be mentioned that because of the intermediate cylinder 63, the overall diameter of the steam generator vessel 60 is slightly increased. However that may be, the increase is not substantial. For example, whereas a prior art steam generator illustrated in FIG. 1 as a diameter of 8 feet, the disclosed generator with the intermediate vessel has a diameter of 9 feet. It will be understood that this invention can be operative in those types of steam generators which do not include a central contained pump. Such a steam generator is illustrated in FIG. 4

Figure 4:
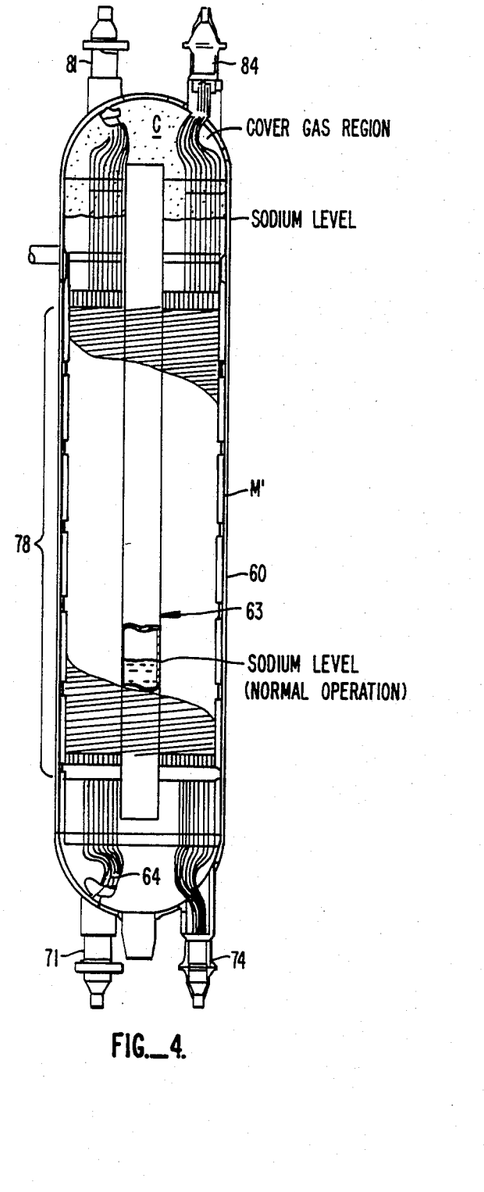
FIG. 4 is a side elevation section of a conventional type of helical coil steam generator with a central bypass passage.

Referring to FIG. 4, a steam generator M' is illustrated having an outer vessel 60 and a single interior cylindrical vessel 63. Vessel 63 opens to a plenum 64 at the bottom and opens to the cover gas region C at the top. As before, helically coiled tubes conventionally run between feedwater inlets 71, 74 at the bottom and steam outlets 81, 84 at the top.

In most steam generator constructions, it is not possible to helically coil the tubes 78 to occupy the entire inner diameter. Consequently, and in the prior art, an inner cylindrical vessel 63 has normally been a vacuous and closed area. Sodium is conventionally withdrawn from plenum 64 in the cold leg and passed to a relief nozzle (the relief nozzle not being shown in the view of FIG. 4).

The reader can understand that the installed conduit 63 without the inner cylinder 62 functions precisely analogous to that illustrated in FIGS. 2 and 3. Specifically, and during normal operation (as shown in FIG. 2) the sodium level in the central duct will be at an elevation supported by the low pressure in the plenum 64. Upon a casualty occurring at the top of the coiled tubes, sodium will empty, and the gas and sodium from the site of the violent reaction will pass interiorly of the central cylinder 63 and out the bottom of the vessel.

The reader will likewise appreciate that varying constructions may be used.

We claim:

1. A steam generator for receiving nonradioactive liquid sodium from a sodium cooled reactor at an intermediate heat exchanger and generating steam for producing power, said steam generator comprising: first and second upstanding cylindrical vessels; said first upstanding cylindrical vessel being exterior, and larger than said second cylindrical vessel, said first vessel closed at the top to define an inert gas plenum and closed at the bottom to define a sodium plenum;

a sodium inlet defined at the top of said first vessel for supplying sodium from said intermediate heat exchanger into an interstitial volume between the inside of said first vessel and the outside of said second vessel;

a sodium outlet communicated to said sodium plenum at the bottom for returning sodium to said intermediate heat exchanger in said reactor;

said second cylindrical vessel being interior and smaller than said first cylindrical vessel, said second vessel open to the bottom of said first cylindrical vessel at said sodium plenum and open at the top to said inert gas plenum within said first cylindrical vessel;

at least one inlet feedwater plenum at the bottom of said first cylindrical vessel communicated to the interstitial volume between said first cylindrical vessel and said second cylindrical vessel;

at least one steam outlet plenum at the top of said first vessel communicated to the interstitial volume between said first cylindrical vessel and said second cylindrical vessel;

a plurality of tubes communicated to said feed water inlet plenum at the bottom and said steam outlet plenum at the top, said tubes being coiled in the interstitial volume between said first and second upstanding cylindrical vessels;

a standing head of sodium in the interstitial volume in said second cylindrical vessel, said standing head of sodium supported by sodium pressure at said sodium plenum; and a rupture diaphragm defined at the bottom plenum of said steam generator, said rupture diaphragm opening responsive to a sodium-water reaction on a casualty involving tube breakage;

said second cylindrical vessel defining means for relieving pressure and flow from an explosive reaction at said tubes through said second cylindrical vessel for opening and rupturing said rupture diaphragm along a path independent of said tubes whereby reactives and the continuing steam and feedwater flow through the broken tubes can pass from said inert gas plenum through said volume interior of said second cylindrical vessel to said diaphragm without causing a sufficiently high pressure drop to cause the sodium/steam interface to be forced back into the intermediate heat exchanger.

2. The invention of claim 1 and including a third upstanding cylindrical vessel, said third upstanding cylindrical vessel open at the bottom to receive sodium and communicated at the top to said sodium outlet at the top, said third cylindrical vessel being interior of and smaller than said second cylindrical vessel.

3. The invention of claim 2 and wherein said third cylindrical vessel includes a sodium pump, said pump disposed to pump sodium from the bottom and open end of said third cylindrical vessel to the top of cylindrical vessel for recirculation to said intermediate heat exchanger of said reactor heating sodium.

4. In combination:

a sodium reactor having a core for said reactor defining a primary sodium loop and a secondary sodium loop;

an intermediate heat exchanger located within said sodium reactor;

first pumping means for pumping sodium in said primary sodium loop through said core through said intermediate heat exchanger and through said pump in an endless loop for carrying the heat of said core to said intermediate heat exchanger;

a steam generator, said steam generator for receiving nonradioactive liquid sodium from the intermediate heat exchanger of said sodium cooled reactor and generating steam for producing power;

second pumping means for pumping sodium in said secondary loop from said intermediate heat exchanger and through said steam generator;

said steam generator including first and second concentric upstanding cylindrical vessels;

said first upstanding cylindrical vessel being exterior, and larger than said second cylindrical vessel, said first cylindrical vessel closed at the top to define a gas plenum overlying the top of said sodium and closed at the bottom to provide a sodium plenum;

a sodium inlet defined at the top of said first vessel for supplying heated sodium from the secondary loop in said sodium reactor into an interstitial volume between the inside of said first vessel and the outside of said second vessel;

a sodium outlet communicated from the bottom of said first cylindrical vessel for the discharge of sodium back to said intermediate heat exchanger in said secondary sodium loop;

said second cylindrical vessel being interior of and smaller than said first cylindrical vessel, said second cylindrical vessel open to the bottom of said first cylindrical vessel at said sodium plenum and defining at the top an opening to gas plenum within said first cylindrical vessel;

at least one inlet feedwater plenum at the bottom of said first cylindrical vessel communicated to the interstitial volume between said first cylindrical vessel and said second cylindrical vessel;

at least one steam outlet plenum at the top of said first cylindrical vessel communicated to the interstitial volume between said first cylindrical vessel and said second cylindrical vessel;

a plurality of tubes communicated to said feedwater inlet plenum at the bottom of said steam outlet plenum, said tubes being coiled in the interstitial volume between said first and second upstanding cylindrical vessels;

a standing head of sodium in the interior of said second upstanding cylindrical vessel, said standing head of sodium supported by sodium pressure at said lower plenum; and a rupture diaphragm defined at the bottom plenum of said steam generator means for relieving pressure and flow from an explosive reaction at said tubes through said second vessel for opening and rupturing said rupture diaphragm along a path independent of said tubes whereby reactives and the continuing steam and feedwater flow from broken tubes in said steam generator can pass through the volume interior of said second cylindrical vessel to said rupture diaphragm without causing the sodium-steam interface to be forced back into said intermediate heat exchanger of said reactor.

5. The apparatus of claim 4 and including a third upstanding cylindrical vessel, said third upstanding cylindrical vessel open at the bottom to communicate to said sodium plenum; and, said third upstanding cylindrical vessel defining said outlet for said sodium to said intermediate heat exchanger, said third upstanding cylindrical vessel defining in the interstices to said second cylindrical vessel a path for reactants to pass out from the top of said first upstanding cylindrical vessel through said rupture diaphragm without causing a sufficiently high pressure drop to cause the steam sodium interface to be forced back into said intermediate heat exchanger.

6. The invention of claim 5 and including at least one pump disposed interior of said third upstanding cylindrical vessel for pumping liquid sodium from said lower plenum into and out of the top of said third upstanding cylindrical vessel.

* * * * *